United States Patent [19]

Hearon et al.

[11] 4,082,743

[45] Apr. 4, 1978

[54] PROCESS FOR THE PRODUCTION OF DIALDEHYDE CELLULOSE FROM CELLULOSE

[75] Inventors: William Montgomery Hearon, Portland, Oreg.; John F. Witte; Cheng Fan Lo, both of Vancouver, Wash.

[73] Assignee: Boise Cascade Corporation, Portland, Oreg.

[21] Appl. No.: 544,849

[22] Filed: Jan. 28, 1975

[51] Int. Cl.$^2$ ............................................. C08B 15/00
[52] U.S. Cl. ...................................................... 536/30
[58] Field of Search ........................................ 260/212

[56] References Cited

U.S. PATENT DOCUMENTS 2,537,978  1/1951  Eberl .................................. 260/212
3,086,969  4/1963  Slager ................................. 260/212

OTHER PUBLICATIONS

Jackson et al., Journal of the American Chemical Society, vol. 59, No. 10, Oct. 6, 1937, pp. 2049–2050.

*Primary Examiner*—Ronald W. Griffin
*Attorney, Agent, or Firm*—Eugene D. Farley

[57] ABSTRACT

Dialdehyde cellulose is produced by reacting cellulose in aqueous medium with meta periodate ion used in a molar ratio of from 1.2 to 12 moles of meta periodate ion per mole of cellulose at a temperature of from 36° to 60° C. and a pH of between 2 and the conversion pH of water soluble meta periodate to water insoluble para periodate, and separating the dialdehyde cellulose product from the reaction mixture.

10 Claims, No Drawings

PROCESS FOR THE PRODUCTION OF DIALDEHYDE CELLULOSE FROM CELLULOSE

BACKGROUND OF THE INVENTION

This invention relates to a process for the manufacture of dialdehyde cellulose. It pertains particularly to a process for the manufacture of dialdehyde cellulose on the large commercial scale by the oxidation of cellulosic pulps derived from the papermaking industry.

Dialdehyde cellulose has important real and potential industrial applications as a paper and textile sizing material, as an adhesive component, as a thickening agent for foods, and in the tanning of hides in the manufacture of leather. In particular, it is useful as an intermediate in the manufacture of a variety of other cellulose derivatives, including dicarboxy cellulose, tricarboxy cellulose, glyoxal and the like.

The oxidative conversion to dialdehyde cellulose of polysaccharides in general, and starch in particular, using periodic acid as an oxidizing agent is well known. In the case of cellulose, the reaction proceeds according to the following schematic equation:

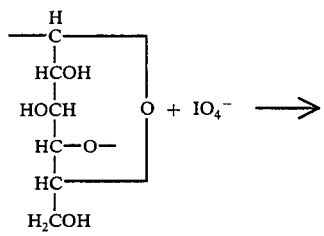

Cellulose

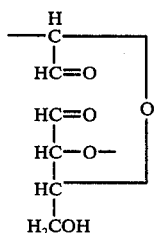

Dialdehyde Cellulose

The general reaction has been described in Jackson et al, the Journal of the American Chemical Society, Vol. 59, pp. 2049–2050, (1937), and in Pfeifer et al., Industrial and Engineering Chemistry. Vol. 52, pp. 201–207 (1960). It is further characterized in Slager, U.S. Pat. No. 3,086,969. The emphasis in these and other prior art investigations, however, has been toward the oxidative conversion of the polysaccharide starch to dialdehyde starch, rather than the conversion of the polysaccharide cellulose to dialdehyde cellulose.

Thus Jackson et al describe in detail successful conversion of starch to dialdehyde starch, but indicate the resistance of cellulose to the oxidation by citing cellulose oxidation times of from 18 to 37 days, and the degradation of the dialdehyde cellulose product by the acid reaction medium.

Similarly, although Slager discloses in a general way the periodic acid oxidation of cellulose to dialdehyde cellulose, he gives specific examples drawn exclusively to the conversion of starch to dialdehyde starch under carefully defined and critical reaction conditions, in particular using a periodic acid reaction medium having a pH of less than 1.0.

It does not necessarily follow that the convertibility of starch to dialdehyde starch under stipulated reaction conditions is an indication that under the same or similar conditions cellulose can be converted to dialdehyde cellulose. It is well established that each chemical entity has its own peculiar characteristics and properties, not necessarily forecastable by comparison to another chemical entity even though the latter be closely related structurally to the former.

Thus, although starch and cellulose broadly are classified together as polysaccharides, they have in fact significant differences of structure and properties. For example, whereas starch is an alpha glucoside, cellulose is a beta glucoside. Starch is a mixture of polymers of amylose and amylopectin cellulose, a linear polymer of beta glucoses. Starch is a powder; cellulose a fiber. Biologically, starch is digestible by humans, whereas cellulose is non-digestible. Another inherent difference is indicated in the Jackson et al reference, supra, wherein an oxidation time of as little as 24 hours is reported for starch, and an oxidation time of as much as 37 days is reported for cellulose, in the conversion of these two substances to their respective dialdehyde derivatives under substantially similar reaction conditions.

The resistance of cellulose to selective oxidation raises significant obstacles to the application of this procedure to the commerical production of dialdehyde cellulose. Thus, the long reaction times of several or many days are unsuited to the successful operation of a commercial process. The comparative resistance of cellulose to oxidation favors the production of a multiplicity of oxidative byproducts, which not only lower the yield of the desired dialdehyde cellulose, but result in contamination of the product.

The same factor promotes the degradation of the periodic acid oxidizing agent to iodine derivatives other than iodic acid. It promotes notably the production of free iodine which, being per se an active oxidizing agent in aqueous medium, attacks the dialdehyde cellulose and converts it inter alia to carboxy celluloses.

The conversion of periodic acid to iodine derivatives other than iodic acid also destroys one of the principal advantages of the periodic acid system for converting cellulose to dialdehyde cellulose, in that whereas in that system the iodic acid product may be converted electrolytically almost quantitatively back to periodic acid, which then may be reused, that is not the case with free iodine and the other reduced products of periodic acid which accordingly are lost for further use in the process. In view of the high cost of iodine and its compounds, this represents a serious economic loss which can spell out the difference between a procedure for the production of dialdehyde cellulose which is commercially successful, and one which is not.

BRIEF DESCRIPTION OF THE INVENTION

The present invention is predicated on the discovery that cellulose may be oxidized by meta periodate ions selectively and almost quantitatively to dialdehyde cellulose in accordance with the reaction set forth above, with substantially no conversion of the periodic acid to products other than iodic acid, and with the substantially quantitative recovery of the latter for conversion to periodic acid, provided the oxidative reaction is carried out under controlled conditions of critical character as set forth herein.

It is a further finding that the dialdehyde cellulose so produced may be isolated in a pure condition, well suited for its various industrial applications, including its use as a raw material for the manufacture of dicarboxy cellulose and other derivatives.

Still another advantage of the process as described herein is the fact that it may be applied to a wide variety of commercially available cellulosic raw materials, and in particular to ordinary papermaking pulp, including the clay-containing sludges available in large quantities as waste byproducts from the clarifiers which are components of conventional papermaking apparatus.

Still another value of the process described herein is that it may be carried out rapidly, i.e. in from 3 to 6 hours, on the large commercial scale, using relatively simple equipment.

The foregoing and other advantages are obtained by the execution of a process which, stated broadly, comprises reacting cellulose in aqueous medium with meta periodate ion used in a molar ratio of from 1.2 to 12 moles periodate ion per mole of cellulose at a temperature of from 36° to 60° C. and a pH of between 2 and the pH at which periodate ion is converted to a water insoluble para periodate. The reaction is carried out for a time sufficient to convert the cellulose substantially completely to dialdehyde cellulose, the meta periodate ion being contemporaneously converted to iodate. In typical instances, this may be accomplished in reaction times of the order of 3 to 6 hours.

Thereafter the dialdehyde cellulose product is separated from the reaction mixture, and washed. The iodate-containing filtrate and washings are processed for conversion of their content of iodate back to a salt of periodic acid, for example sodium meta periodate, which then is reused in the conversion of a further quantity of cellulose to dialdehyde cellulose.

DESCRIPTION OF PREFERRED EMBODIMENTS OF THE INVENTION

Considering the foregoing in greater detail:

A wide variety of cellulosic substances may be used as starting materials for the process of the present invention. These include cotton, as well as cellulosic materials derived from wood. The materials employed should be relatively free from metallic ion contaminants, but may contain substantial quantities, i.e., as much as 40% by weight or more, of inert contaminants. Especially applicable are the cellulosic pulp slurries derived from the paper industry. These may be either original slurries, re-slurried wet lap, or slurries reconstituted from dried pulp, and may have their origin in any of the wood species which conventionally are converted to papermarking pulps.

It is a particular feature of the process of the invention that it may be applied to the pulp slurries obtained as sludges in the clarifiers and other units of papermaking apparatus even though such sludges contain large amounts of clay and other inert components. The invention thus provides a useful outlet for the utilization of these low cost materials with the end result of converting them into a useful product, dialdehyde cellulose, of substantially increased value. It also assists in overcoming a serious problem of sludge disposal.

The cellulose starting material need be subjected to no special purification or treating procedures before being employed in the hereindescribed process, especially when it comprises a cellulosic papermaking pulp. If a reconstituted pulp is employed, the cellulose preferably first is fluffed to provide a maximum surface area and thus accelerate the reaction rate correspondingly. The cellulosic fibers may have an inherent moisture content of from 1 to 10% by weight.

The foregoing and other cellulose starting materials are employed in aqueous medium at consistencies, expressed as percentage concentration of the cellulose in the reaction mixture, suitable for maximum efficiency of use of the selective oxidizing agent employed. The consistency selected is determined by such factors as the water content of the cellulose fibers, the solubility of the oxidizing agent employed, and the presence or absence of substantial amounts of clay or other inert adulterants. It also is determined by working factors such as the ease of mixing the reactants and washing the product for dialdehyde cellulose purification and chemical recovery in the particular apparatus employed.

The consistency also should be adjusted to take into account the respective water solubilities of the reactants and products. Thus if the oxidizing agent is sodium meta periodate, the consistency of the reaction mixture should be sufficiently low to insure the solubility of the sodium meta periodate reactant and of the sodium iodate product. It is apparent that using insufficient water to insure the solubility of the sodium meta periodate would reduce the speed of reaction as well as the ultimate yield. Using insufficient water to insure the solubility of the sodium iodate product would promote precipitation of the latter from the reaction mixture with attendant problems of product recovery and purification.

In general, the pulp should have a consistency of between 1 and 15% by weight. A consistency of below 1% is so dilute as to be impractical for commercial operation of the process. A consistency of greater than 15% introduces problems of mixing the reactants, establishing uniform reaction conditions, and washing the product. A preferred consistency range is from 4 to 8% by weight.

The oxidizing agent employed for the selective and almost quantitative conversion of the cellulose to dialdehyde cellulose is an aqueous solution of meta periodate ions. The oxidizing agent thus may have as its source a meta periodate of sufficient water solubility to be useful, and free from metallic ions which may adversely affect the course of the reaction. Sodium meta periodate is a preferred example of such a compound. Periodic acid, derived by electrolytic processes from iodic acid, or by chemical oxidation of elemental iodine, also may be employed. In the latter case adjustment of the pH of the periodic acid product to a value of pH 2 to pH 4.6 is required.

The ratio of use of the reactants, i.e., the molar ratio of meta periodate ion to cellulose, is important to the successful operation of the hereindescribed process. If too little of the oxidizing agent is used, the reaction will proceed slowly and the degree of conversion of the cellulose to dialdehyde cellulose will be correspondingly low. If the molar ratio is too high, overoxidation of the cellulose is favored, with consequent loss of product through oxidative degradation of the cellulose, the formation and loss of free iodine, and excessive consumption of the cellulose starting material.

Additionally, the upper molar ratio limit is determined by practical considerations such as the high cost of iodine and its derivatives, the desirability of maintaining a given reaction mixture consistency, and the necessity of establishing a reaction mixture which can be worked up effectively.

In view of these various considerations, it is desirable to employ in the present process a molar ratio of meta periodate ion to cellulose of 1.2 to 12, preferably 1.2 to 3.

Critical to the success of the hereindescribed procedure is adjustment of the pH of the reaction mixture to a predetermined value of between pH 2 and pH 4.6. Where sodium meta periodate is employed as the source of the oxidizing meta periodate ions, establishment of a pH of greater than 4.6 results in the conversion of the water soluble meta periodate to the water insoluble para periodate in accordance with the following equation:

$$NaIO_4 + 2 NaOH \rightarrow Na_3H_2IO_6 \downarrow$$

Precipitation of the sodium para periodate obviously would remove from the reaction mixture a significant part or all of the periodate ions needed for the reaction, thereby at the least reducing the dialdehyde cellulose content of the product, and at the most rendering the desired selective oxidation totally impossible of execution.

Reducing the pH of the reaction mixture to a value of less than pH 2 has the adverse and critical effect of destroying altogether the selective character of the oxidation, i.e., the oxidation of the cellulose selectively to dialdehyde cellulose with negligible production of carboxy celluloses, and of the further oxidative degradation products of cellulose.

Concomitant with the overoxidation of the cellulose, is the overreduction of the meta periodate, with the consequent production of free iodine and of the lower valent compounds of iodine. This has two adverse effects:

First, since free iodine in aqueous medium is an oxidizing agent, it overoxidizes and solubilizes the cellulose in the manner explained above. Second, it causes loss of iodine, and thus prevents the recovery of iodine by the conversion of the iodic acid reaction product to meta periodate starting material. Loss of iodine is fatal to the successful commercial operation of the hereindescribed process, since its success is keyed to the substantially total recovery and re-use of the high cost iodine-containing reactants.

It is to be noted further that in regard to the execution of the procedure necessarily at a pH level of from 2 to 4.6, a fundamental and surprising distinction between the behavior of the polysaccharide starch and the polysaccharide cellulose is evidenced. As set forth in Slager U.S. Pat. No. 3,086,969, supra, the periodate oxidation of starch requires a reaction mixture pH of less than 1; as disclosed herein, the commercially successful periodate oxidation of cellulose requires a reaction mixture pH of from pH 2 to pH 4.6.

Still another reaction variable requiring close control in the execution of the hereindescribed procedure is the reaction temperature. In general, the process may be carried out satisfactorily using a reaction temperature of from 36° to 60° C. More specifically, a preferred temperature range is constituted by the range of from 40° to 50° C.

Where the reaction temperature is below 36° C., the reaction takes place too slowly to be practical. In fact, where the temperature is at ambient room temperature, reaction times of several days are required for its completion. On the other hand, where the reaction temperature is above 60° C. the reaction becomes erratic. The yields and expected results from successive runs are not reproduceable and undesirable side reactions occur. These are of the character noted above, involving overoxidation of the cellulose and overreduction of the meta periodate. As a consequence, there tend to be formed as by-products substantial amounts of carboxy cellulose and of the oxidative degradation products of cellulose. Also, free iodine is formed, resulting in undesired degradation of the cellulose and in loss of iodine. Still further, the water insolubility and other physical properties of the desired dialdehyde cellulose product are affected adversely, with detriment to its ease of recovery and its application to its various end uses.

The duration of the reaction is determined principally by the variables discussed above, in particular the consistency, molar ratio of reactants, pH and temperature. It is a feature of the invention, however, that when these variables are controlled within the limits set forth, the reaction will proceed almost to completion in an operating period of from 3 to 6 hours. In other words, at the end of this reaction duration, the cellulose will have been converted practically quantitatively to dialdehyde cellulose, to the substantial exclusion of carboxy celluloses and other cellulose oxidation products, and the meta periodate consumed will have been converted quantitatively to iodate, thus determining the successful effectuation of the process on a commercial scale.

Procedurally the process of the invention for the selective oxidative conversion of cellulose to dialdehyde cellulose is carried out in a simple and uncomplicated manner.

The waste paper pulp or other selected cellulose starting material is placed in a reaction vessel and mixed with water to the desired consistency. Sodium meta periodate or other source of meta periodate ion is added in predetermined amount. One alternate source of meta periodate ion comprises sodium para periodate having its pH adjusted to a value of pH 2 to pH 4.6 and resulting from the chemical oxidation of iodine. Another source of the periodate ion is the iodic ion resulting from a previous run, and oxidized to periodate ion electrolytically.

The pH of the reaction mixture is adjusted to the desired level of pH 2 to pH 4.6 by adding any strong acid which is nonreactive toward the other constituents of the mixture. Suitable acids are sulfuric acid, phosphoric acid, or benzene sulfonic acid. Unsuitable acids are the halogenated acids which are oxidizable under the conditions of the reaction, and nitric acid which per se is an oxidizing agent reactive toward the desired dialdehyde cellulose product.

The temperature of the reaction mixture is adjusted to the desired level of between 36° and 60° C. and controlled throughout the entire reaction. Where the reaction is exothermic, such control may be achieved by circulating cooling water as required through the jacket of a jacketed reaction vessel.

At the conclusion of the reaction period, after the cellulose has been substantially completely converted to dialdehyde cellulose, the latter is separated from the reaction mixture and washed one or more times with water. As thus obtained, the dialdehyde cellulose is sufficiently pure for most of its commercial uses.

The washings are processed for recovery of their content of iodate compound. This is accomplished chemically, or by electrolytic oxidation of the iodate to meta periodate in well known manner. The meta periodate then is used in the oxidation of a further quantity of cellulose to dialdehyde cellulose.

It is a particular feature of the invention, which makes it highly attractive commercially, that the procedure outlined above proceeds almost quantitatively to yield reaction products which may be isolated in a pure condition with almost no loss of reagents.

Thus the conversion of the cellulose to a dialdehyde cellulose product having substantially two carbonyl groups per glucose unit takes place in yields of 95 to 100%, typically about 98%, and the dialdehyde cellulose product is isolated in a form and condition well suited to its various commercial uses.

Similarly, the electrolytic conversion of the iodate product to meta periodate occurs in yields of from 96 to 100%, typically 98% or better. It, too, is recovered in a commercially useful form in which it may be applied to the oxidation of a further quantity of cellulose to dialdehyde cellulose.

The process of the invention is illustrated in the following examples, wherein parts are given in parts by weight.

EXAMPLE 1

This example illustrates a preferred process for carrying out the oxidative conversion of cellulose to dialdehyde cellulose.

The cellulose raw material for this procedure was a reconstituted pulp made up of well fluffed cellulose derived from bleached kraft pulp made from Douglas fir and Pine wood chips. It had a water content of 6.3% by weight.

69.2 Grams (0.4 mole) of air dried cellulose (6.4% water content) and 1000 ml. of water at 50° C. were placed in a reaction vessel provided with stirring and heat control means. 107.0 Grams (0.5 mole), a 25% molar excess, of sodium meta periodate was added. This represents a molar ratio, periodate ion to cellulose, of 1.25. The reaction mixture was blended at high speed until the cellulose was well dispersed. The pH of the dispersed mixture was 4.6. Its consistency was 6.25%.

The reaction mixture was gently agitated at 50° C. for 5 hours while maintaining the pH at a value of from 3 to 4.6.

The reaction mixture then was filtered to separate the solid dialdehyde cellulose product. An aliquot of the filtrate was analyzed for periodate content and the total amount of periodate calculated. The value obtained indicated a dialdehyde cellulose content of 100.5% of the theoretical, the excess percentage value being within the limits of experimental error.

The filtered dialdehyde cellulose product was washed with one 500 ml. portion of water, next with two 200 ml. portions of water, and finally with two 200 ml. portions of methanol.

After air drying the dialdehyde cellulose product weighed 62.5 grams, or 97.5% of theory.

EXAMPLE 2

This example illustrates the application of the process of the invention to a papermaking pulp obtained as a waste residue from paper mill clarifiers and containing a large proportion of clay filler.

The papermaking pulp employed comprised the sludge residue obtained from the clarifiers of a large kraft paper mill. The sludge contained 45.6% cellulose and 54.4% papermaking clay, including a proportion of titanium dioxide and other inorganic fillers.

17.65 Grams of sodium paraperiodate and 100 ml. water were placed in a three-neck, 1-liter flask. The sodium paraperiodate was acidified with 5% sulfuric acid to a pH of 3.65, thereby converting it to sodium meta periodate. Water than was added to a total volume of 203.75 ml.

17.75 Grams of the cellulosic sludge having a cellulose content of 8.094 grams was added to the flask and mixed in. The consistency of the mixture was 3.6% and the molar ratio, meta periodate to cellulose, was 1.2.

The mixture was heated at 32°–40° C. with stirring for 8 hours.

Periodically, an aliquot of 0.50 ml. of the clear reaction solution was titrated with standard 0.05 N sodium arsenite to determine the end point of the oxidation.

After a reaction period of eight hours the pH of the reaction mixture was 3.5. The fully oxidized sludge was collected on a filter and washed with water. It then was dried at 100° to 105° C. for 3 hours, to constant weight. It weighed 17.1142 grams. Determination of carboxyl following a Cannizzaro reaction gave a value of 24.98%. This indicated a dialdehyde cellulose content of 97.69%.

The cellulosic content of the sludge thus was converted substantially completely to dialdehyde cellulose isolated in a form suitable for conversion to other cellulose derivatives and for separation from its substantial content of clay.

The dialdehyde cellulose obtained as above was separated from its content of clay by placing 10 grams of the dialdehyde cellulose sludge and 150 ml. water in a 300 ml. round bottom flask. The mixture was refluxed for 2½ hours on an oil bath kept at 120° C.

The resulting dialdehyde cellulose solution was separated from the clay residue by filtering it hot and washing the clay residue with hot water. The filtrate then was concentrated in a steam heated rotary evaporator. The concentrate was evaporated to dryness. It had a constant weight of 4.26 grams, representing a 94.67% yield of dialdehyde cellulose. This product had a Cannizzaro-reaction-determined dialdehyde cellulose content of 97.78%.

EXAMPLE 3

This example illustrates the application of the process of the invention to the conversion of cotton to dialdehyde cellulose. It also illustrates the use of sodium paraperiodate as the source of the meta periodate ion used as the oxidizing agent.

A mixture of 17.65 grams sodium para periodate and 100 ml. water contained in a 1 liter flask was acidified with 5% sulphuric acid to a pH of 3.65. Additional water was added to exactly 160 ml.

8.05 Grams of cotton cellulose was added to the mixture in the flask and heated immediately to 50° C. The consistency of the resulting reaction mixture was 3.6% and the molar ratio, meta periodate to cellulose, was 1.2. The reaction mixture was maintained at this temperature with constant stirring for 7.5 hours.

The progress of the reaction was followed by titrating 0.50 ml. aliquots of the clear reaction liquor with standard 0.05 N sodium arsenite, in the presense of sodium bicarbonate buffer and 0.50 gram potassium iodide, using starch as an indicator. After a reaction period of 7½ hours, the reaction mixture had a pH of 3.5.

The solution then was filtered off and the dialdehyde cellulose product washed with water and dried at 105° C. for 3 hours. The weight of the dried product was 7.92 grams, or a yield of 99.62%. A Cannizzaro determination of aldehyde indicated an aldehyde content of 99.29% of theory.

EXAMPLE 4

This example illustrates the effect of temperature on the hereindescribed procedure.

The cellulose used was a mixture of Douglas fir and Ponderosa pine pulp. It had a water content of 6.3% by weight.

To a suspension of 69.2 grams (0.4 mole) of the well fluffed cellulose in 2000 ml. of water at 50° C. was added 107.0 grams (0.5 mole) of sodium meta periodate. The reaction mixture was contained in a flask equipped with means for stirring and heating. It had a pH of 4.6 and a consistency of 3.2%. The molar ratio of periodate ion to cellulose was 1.25.

The reaction mixture was stirred at 50° C. for 5 hours and filtered. An aliquot of the filtrate was analyzed iodimetrically for periodate content. The value obtained indicated a dialdehyde content of 100.5% of the theoretical.

The filtered dialdehyde cellulose was washed with 3 × 500 ml. portions of water, then with 2 × 200 ml. portions of methanol, and dried to constant weight at room temperature. The yield of isolated product was 62.5 grams, or 97.5% of theory.

The foregoing procedure was repeated with selected reaction temperatures of between 20° and 60° C. for selected reaction periods. In all cases the oxidation was carried out at a pH of 4.6 with a 25% molar excess of sodium meta periodate. The results are indicated in Table I below.

TABLE I

| Temp. ° C. | Time | Carbonyl Content (% of Theory) | Dialdehyde Cellulose Yield (% of Theory) |
|---|---|---|---|
| 20° | 3 Days | 91 | 99 |
| 20° | 4 Days | 99+ | 98 |
| 43° | 1 Hour | 30 | 98 |
| 43° | 2 Hours | 59 | 97 |
| 43° | 3 Hours | 81 | 97 |
| 43° | 4 Hours | 90 | 97 |
| 43° | 5 Hours | 94 | 97 |
| 43° | 9 Hours | 100 | 97 |
| 50° | 5 Hours | 101 | 96 |
| 60° | 2 Hours | 94 | 96 |
| 60° | 3 Hours* | | |
| 60° | 4 Hours* | | |

*Excessive decomposition present

It is apparent from the foregoing that at reaction temperatures of the order of 20° C., the required reaction time is inordinately long. On the other hand, overoxidation and decomposition, as evidenced by the production of free iodine and decreased yield of dialdehyde cellulose, became evident at 60° C.

EXAMPLE 5

The following example illustrates the adverse effect of carrying out the hereindescribed reaction at a pH value of less than pH 2.

Sodium paraperiodate, 17.8500 grams in 100 ml. water, was acidified with 2% sulfuric acid to a pH of 1.1. Water was added to a final volume of 204 ml.

17.750 grams of papermill sludge containing 8.1 grams of cellulose was added to form a mixture having a consistency of 3.6% and a molar raio of periodate ion to cellulose of 1.66. This mixture was heated to a temperature of 39° to 46° C. and stirred constantly over a reaction period of 4 hours.

During the reaction period excessive decomposition of the periodate started after a reaction time of ¾ hour and continued over the entire reaction period, as indicated by the liberation of free iodine in the reaction mixture. This was formed in increasing amount, the color of the reaction mixture changing during the course of the reaction from light brown to dark brown to purple.

At the end of the reaction period, the mixture was filtered and the oxidized cellulosic sludge washed with water and then oven dried to constant weight. The dried product had a dialdehyde cellulose content of 4.35 grams. This indicates a 45.64% loss of dialdehyde cellulose through overoxidation of the cellulose starting material.

The filtrate and washings of the oxidation mixture were processed to determine the loss of periodate oxidizing agent.

To this end the filtrate and washings were neutralized with 5% sodium hydroxide after which 7.3 grams of excess sodium hydroxide was added. This represented 3 moles of sodium hydroxide per mole of sodium paraperiodate. The mixture was heated on a steam bath and bubbled with chlorine until it was neutral. After the reaction mixture had remained at room temperature over night, the precipitated sodium metaperiodate was filtered off, dried and weighed. It weighed 3.81 grams, indicating a loss of periodate during the oxidation of 78.55%.

EXAMPLE 6

This example illustrates the process of the invention with incremental meta periodate addition during the course of the reaction.

A suspension of 0.87 grams (0.005 mole) of fluffed paper pulp cellulose derived from Douglas fir and pine wood chips and having a 6% moisture content was mixed in a reaction vessel with 25 ml of 0.25 molar sodium meta periodate. The consistency of the reaction mixture was 3.4%. Its pH was 4.6 and the molar ratio of periodate ion to cellulose was 2.04. During the course of the reaction the mixture was kept at 43° C. with occasional shaking.

At 1 hour intervals the reaction mixture was analyzed with sodium arsenite for periodate content. Sufficient solid sodium periodate then was added to bring the concentration of periodate back to 0.25 molar and the pH to 3 to 4.6. The percent oxidation was calculated from the amount of periodate consumed. The reaction was complete in 5 hours. The data are given below.

TABLE II

| Hrs. | Ratio of Total Periodate Employed to Cellulose | Millimols Periodate Added | Cumulative Millimols Periodate Added | Carbonyl Content (% of Theory) |
|---|---|---|---|---|
| 0 | 1.25:1 | 0 | 6.25 | 0 |
| 1 | 1.2:1 | 1.62 | 7.87 | 32 |
| 2 | 1.57:1 | 1.37 | 9.24 | 59 |
| 3 | 1.85:1 | .98 | 10.22 | 79 |
| 4 | 2.04:1 | .37 | 10.59 | 87 |
| 5 | 2.04:1 | 0 | 10.59 | 98 |

At the conclusion of the reaction, the dialdehyde pulp was water separated from the reaction mixture by filtration and washed twice with water used in amount equal to one-half the volume of the oxidizing solution, and air dried.

EXAMPLE 7

This example illustrates the high efficiency of iodine recovery which may be achieved by the practice of the present invention.

A suspension of 9.35 grams of cellulose pulp (0.054 mole) having a water content of 6.8% was suspended in a solution of 14.378 grams sodium paraperiodate in 100 ml. water. The consistency of the reaction mixture was 7.55%. The molar ratio of periodate ion to cellulose was 1.25.

The reaction mixture was heated with stirring at 43° C. for 5 hours. At hourly intervals additional sodium metaperiodate was added as required to keep the periodate concentration at approximately its starting value.

At the end of the reaction period the oxidized pulp was filtered and washed with 5 × 100 ml. portions of water. The initial and subsequent filtrates were kept separate and analyzed for iodine content. The percent iodine recovery in each was calculated and tabulated cumulatively. The results are shown in the following table:

| Moles $IO_4^-$ in reaction Filtrate | Moles $IO_3^-$ in reaction Filtrate | Total moles Iodine in reaction filtrate | % Iodine Recovered |
|---|---|---|---|
| 0.0528 | 0.0532 1st Wash Filtrate | 0.1060 | 84.8 |
| 0.0087 | 0.0075 2nd Wash Filtrate | 0.0162 | 13.0 |
| 0.0013 | 0.0001 3rd & 4th Wash Filtrate | 0.0014 | 1.1 |
| 0.0012 | 0.0001 | 0.0013 | 0.96 |
| TOTALS: 0.0640 | 0.0609 | 0.1249 | 99.9% |

As indicated, the recovery of iodine was substantially quantitative.

Having thus described the invention, we claim:

1. The process for the production of dialdehyde cellulose which comprises: reacting cellulose in aqueous medium with meta periodate ion using from 1.2 to 12 moles meta periodate ion per mole cellulose at a temperature of from 36° to 60° C. and a pH of between 2 and the pH at which periodic acid is converted in aqueous medium to a substantially water insoluble paraperiodate, for a time sufficient to convert the cellulose substantially completely to dialdehyde cellulose, and separating the dialdehyde cellulose product from the reaction mixture.

2. The process of claim 1 wherein the cellulose comprises cellulosic paper making pulp.

3. The process of claim 1 wherein the cellulose comprises cellulosic papermaking pulp containing finely divided clay and derived as a waste byproduct from the clarifiers and other cellulose recovery components of papermaking apparatus.

4. The process of claim 1 wherein the cellulose comprises cotton.

5. The process of claim 1 wherein the cellulose is reacted with the meta periodate ion in aqueous medium at a consistency of 1 to 15% by weight.

6. The process of claim 1 wherein the molar ratio of meta periodate ion to cellulose is from 1.2 to 3.

7. The process of claim 1 wherein the temperature of reaction is from 40° to 50° C.

8. The process of claim 1 wherein the reaction between the meta periodate ion and cellulose is carried out at a pH of from 2 to 4.6.

9. The process of claim 1 wherein the reaction duration is from 3 to 6 hours.

10. The process for the production of dialdehyde cellulose which comprises: reacting cellulose in aqueous medium at a consistency of from 1 to 15% by weight with meta periodate ion used in a molar ratio of from 1.2 to 3 moles meta periodate ion per mole of cellulose at a temperature of from 40° to 50° C. and a pH of from 2 to 4.6, for a time sufficient to convert at least 95% by weight of the cellulose to dialdehyde cellulose, and separating the dialdehyde cellulose product from the reaction mixture.

* * * * *